(12) United States Patent
Zhou et al.

(10) Patent No.: US 12,189,863 B2
(45) Date of Patent: Jan. 7, 2025

(54) GESTURE RECOGNITION METHOD AND APPARATUS, AND STORAGE MEDIUM (71) Applicant: GUANGDONG OPPO MOBILE TELECOMMUNICATIONS CORP., LTD., Dongguan (CN)

(72) Inventors: Yang Zhou, Palo Alto, CA (US); Jie Liu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 347 days.

(21) Appl. No.: 17/749,934

(22) Filed: May 20, 2022

(65) Prior Publication Data

US 2022/0343687 A1    Oct. 27, 2022

Related U.S. Application Data

(63) Continuation of application No. PCT/CN2020/127568, filed on Nov. 9, 2020.

(51) Int. Cl.
*G06T 7/50* (2017.01)
*G06F 3/01* (2006.01)
(Continued)

(52) U.S. Cl.
CPC ............... *G06F 3/017* (2013.01); *G06T 7/50* (2017.01); *G06V 10/25* (2022.01); *G06V 10/44* (2022.01);
(Continued)

(58) Field of Classification Search
CPC .......... G06T 7/50; G06V 10/25; G06V 40/11; G06V 20/64
See application file for complete search history.

(56) References Cited

U.S. PATENT DOCUMENTS

2018/0341333 A1    11/2018  Molchanov et al.

FOREIGN PATENT DOCUMENTS

CN    105335722 A    2/2016
CN    106875465 A    6/2017
(Continued)

OTHER PUBLICATIONS

International Search Report and Written Opinion dated Feb. 1, 2021 in International Application No. PCT/CN2020/127568. English translation attached.

(Continued)

*Primary Examiner* — Sam Bhattacharya
(74) *Attorney, Agent, or Firm* — Sheppard, Mullin, Richter & Hampton LLP (57) ABSTRACT

Provided are a gesture recognition method and apparatus, and a storage medium. The method includes: obtaining a first feature map corresponding to a target region in a depth image, and determining a target key point from the first feature map; establishing a three-dimensional coordinate system in the first feature map by using the target key point, and predicting other three-dimensional coordinates of other key points in the three-dimensional coordinate system, the other key points being key points other than the target key point in the first feature map; and determining, based on the target key point and the other three-dimensional coordinates, a plurality of absolute coordinates of a plurality of key points, to determine a gesture of a target recognition object in the target region based on the plurality of absolute coordinates, the plurality of key points including the target key point and the other key points.

13 Claims, 7 Drawing Sheets

(51) Int. Cl.
  *G06V 10/25* (2022.01)
  *G06V 10/44* (2022.01)
  *G06V 10/82* (2022.01)
  *G06V 20/64* (2022.01)
  *G06V 40/10* (2022.01)
  *G06V 40/20* (2022.01)

(52) U.S. Cl.
  CPC .............. *G06V 10/82* (2022.01); *G06V 20/64* (2022.01); *G06V 40/11* (2022.01); *G06V 40/28* (2022.01); *G06T 2207/10028* (2013.01)

(56) References Cited

FOREIGN PATENT DOCUMENTS

| CN | 108549489 A | 9/2018 |
|---|---|---|
| CN | 108960036 A | 12/2018 |
| CN | 109308459 A | 2/2019 |
| CN | 109635621 A | 4/2019 |
| CN | 109657634 A | 4/2019 |
| CN | 110110614 A | 8/2019 |
| CN | 110163048 A | 8/2019 |
| CN | 110221690 A | 9/2019 |
| CN | 110348524 A | 10/2019 |
| CN | 110443154 A | 11/2019 |

OTHER PUBLICATIONS

First Office Action from corresponding Chinese Application No. 2020800716388, dated Oct. 21, 2022. English translation attached.
Extended European Search Report dated Nov. 30, 2022 received in European Patent Application No. EP 20889322.2.
The Second Office Action from corresponding Chinese Application No. 202080071638.8, dated May 25, 2023. English translation attached.
The Communication pursuant to Article 94(3) EPC corresponding European Application No. 20889322.2 dated Aug. 23, 2024.

| Obtaining a first feature map that is a feature map corresponding to a target region in a depth image, and determining a target key point from the first feature map | S101 |

| Establishing a three-dimensional coordinate system in the first feature map by using the target key point, and predicting other three-dimensional coordinates of other key points in the three-dimensional coordinate system, the other key points being key points other than the target key point in the first feature map | S102 |

| Determining, based on the target key point and the other three-dimensional coordinates, a plurality of absolute coordinates of a plurality of key points, to determine a gesture of a target recognition object in the target region based on the plurality of absolute coordinates, the plurality of key points including the target key point and the other key points | S103 |

GESTURE RECOGNITION METHOD AND APPARATUS, AND STORAGE MEDIUM

CROSS-REFERENCE TO RELATED APPLICATIONS

This application is a continuation of International Application No. PCT/CN2020/127568, filed on Nov. 9, 2020, which claims priority to U.S. Provisional Patent Application No. 62/938,196, filed on Nov. 20, 2019, and titled with "METHOD AND SYSTEM TO RECOVER THE DEPTH OF 3D HAND POSE BY LOCAL 3D HAND POSE ESTIMATION FOR A MOBILE TOF CAMERA". The disclosures of the aforementioned applications are hereby incorporated by reference in their entireties.

FIELD

The present disclosure relates to the technical field of image recognition, and more particularly, to a gesture recognition method and apparatus, and a storage medium.

BACKGROUND

The ability to accurately and efficiently reconstruct hand gestures from images is expected to bring new applications in fields such as Virtual Reality (VR), Augmented Reality (AR), robotic control, and sign language recognition. Especially with the advent of depth cameras, the reconstruction of hand gestures has made a great progress. However, it is still a difficult task due to problems such as unconstrained global and local gesture changes, frequent occlusions, local self-similarity, and a high degree of articulation.

At present, three-dimensional (3D) hand gesture estimation is achieved by predicting three-dimensional absolute coordinate values of key points of the hand. Since the absolute coordinates are not bounded numbers and exhibit a great variance, it is difficult to predict the three-dimensional absolute coordinates, resulting in problems such as great error and low accuracy of gesture recognition.

SUMMARY

The embodiments provide a gesture recognition method and apparatus, and a storage medium, which can reduce the error of gesture recognition and improve the accuracy of gesture recognition.

The technical solutions of the present disclosure are realized as follows.

In a first aspect, the present disclosure provides a gesture recognition method. The method includes: obtaining a first feature map that is a feature map corresponding to a target region in a depth image, and determining a target key point from the first feature map; establishing a three-dimensional coordinate system in the first feature map by using the target key point, and predicting other three-dimensional coordinates of other key points in the three-dimensional coordinate system, the other key points being key points other than the target key point in the first feature map; and determining, based on the target key point and the other three-dimensional coordinates, a plurality of absolute coordinates of a plurality of key points, to determine a gesture of a target recognition object in the target region based on the plurality of absolute coordinates, the plurality of key points including the target key point and the other key points.

In a second aspect, the present disclosure provides a gesture recognition apparatus. The apparatus includes: an obtaining component configured to obtain a first feature map that is a feature map corresponding to a target region in a depth image; a determining component configured to: determine a target key point from the first feature map; determine, based on the target key point and other three-dimensional coordinates, a plurality of absolute coordinates of a plurality of key points, to determine a gesture of a target recognition object in the target region based on the plurality of absolute coordinates, the plurality of key points comprising the target key point and other key point; a coordinate system establishment component configured to establish a three-dimensional coordinate system in the first feature map by using the target key point; and a coordinates prediction component configured to predict the other three-dimensional coordinates of the other key points in the three-dimensional coordinate system, the other key points being key points other than the target key point in the first feature map.

In a third aspect, the embodiment provides a gesture recognition apparatus. The apparatus includes a processor and a memory. The processor, when executing an operating program stored on the memory, implements the method described in the first aspect.

In a fourth aspect, the embodiment provides a storage medium having a computer program stored thereon. The computer program, when executed by a processor, implements the method described in any one of the above aspects.

The embodiments provide a gesture recognition method and apparatus, and a storage medium. The method includes: obtaining a first feature map that is a feature map corresponding to a target region in a depth image, and determining a target key point from the first feature map; establishing a three-dimensional coordinate system in the first feature map by using the target key point, and predicting other three-dimensional coordinates of other key points in the three-dimensional coordinate system, the other key points being key points other than the target key point in the first feature map; and determining, based on the target key point and the other three-dimensional coordinates, a plurality of absolute coordinates of a plurality of key points, to determine a gesture of a target recognition object in the target region based on the plurality of absolute coordinates, the plurality of key points including the target key point and the other key points. With the above implementation scheme, the gesture recognition apparatus determines the target key point from the first feature map, establishes the three-dimensional coordinate system based on the target key point, and then predicts the other three-dimensional coordinates of the other key points in the three-dimensional coordinate system. The gesture recognition apparatus indirectly calculates the plurality of absolute coordinates of the plurality of key points based on the other three-dimensional coordinates. Due to the slight calculation error of the three-dimensional coordinate system established based on the target key point, the error of gesture recognition can be reduced, thereby improving the accuracy of gesture recognition.

DESCRIPTION OF EMBODIMENTS

In order to explain the purpose, technical solutions and advantages of the present application, the present application will be described in detail below with reference to the accompanying drawings and embodiments. It should be understood that the specific embodiments described herein are only intended to explain the present disclosure, but not to limit the present disclosure.

Figure 1:
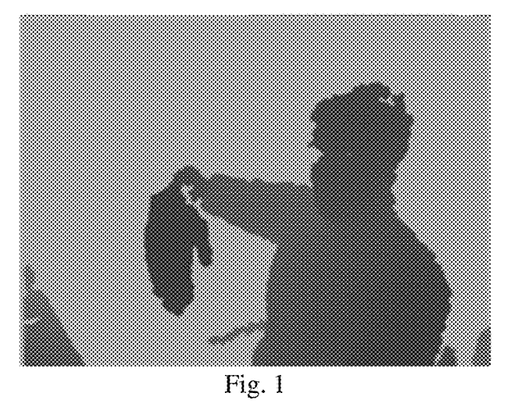
FIG. 1 is a schematic diagram of a depth image captured by a TOF camera.

A Time-Of-Flight (TOF) camera is a range imaging camera system, which adopts the time-of-flight technology to resolve an image distance between a camera and an object by measuring the round-trip time of an artificial light signal provided by a laser or a light-emitting diode (LED). The TOF camera outputs an image with a size (H×W), and each pixel value on this 2D image represents a depth value of the object (i.e., the pixel value ranges from 0 mm to 3000 mm). FIG. 1 illustrates an exemplary image captured by the TOF camera. In the following, an image captured by such TOF camera is considered as a depth image.

After the depth image is captured by the TOF camera, a hand detection is performed on the depth image, and then a probability of hand presence (i.e., a number ranging from 0 to 1, a larger value indicating a confidence of hand presence) and a bounding box of a hand (i.e., a bounding box representing a position and size of the hand) are outputted.

Figure 2:
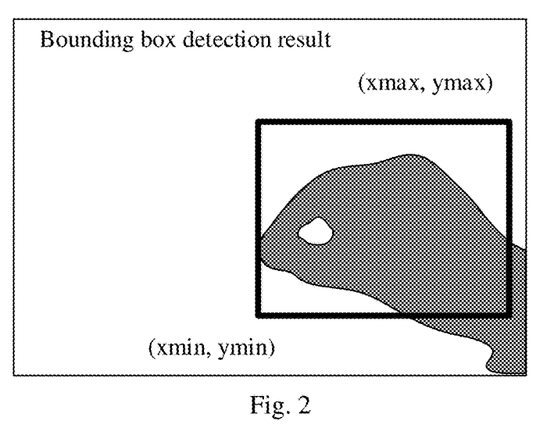
FIG. 2 is a schematic diagram of a bounding box detection result.

FIG. 2 illustrates an exemplary bounding box detection result represented by (xmin, ymin, xmax, ymax), where (xmin, ymin) indicates an upper left corner of the bounding box and (xmax, ymax) indicates a bottom right corner of the bounding box.

After the probability of hand presence and the bounding box of the hand are outputted by the hand detection, 2D hand gesture estimation and/or 3D hand gesture estimation can be performed.

Figure 3:
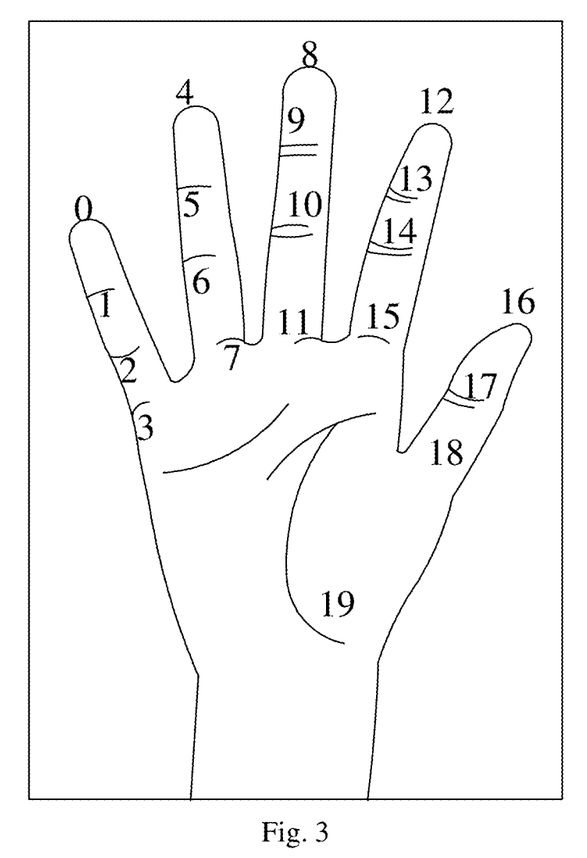
FIG. 3 is a schematic diagram of positions of key points of a hand.
Figure 4:
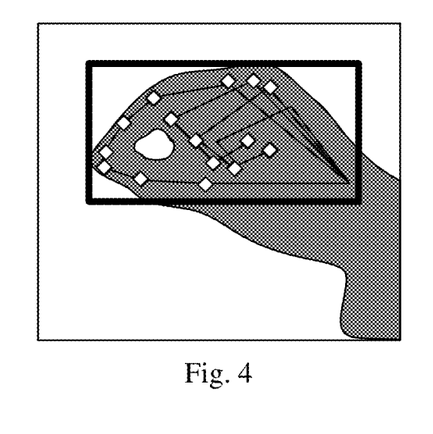
FIG. 4 is a schematic diagram of a two-dimensional (2D) hand gesture estimation result.

For the 2D hand gesture estimation, a depth image is inputted, and positions of 2D key points of hand bones are outputted. An exemplary image of positions of key points of a hand is illustrated in FIG. 3. Each key point is 2D coordinates, for example, (x, y), where x is the coordinate on the horizontal image axis and y is the coordinate on the vertical image axis, representing the position. A 2D hand gesture estimation result is illustrated in FIG. 4.

For the 3D hand gesture estimation, a depth image is inputted, and positions of 3D key points of hand bones are outputted. An exemplary image of positions of key points of a hand is illustrated in FIG. 3. A position of each key point is 3D coordinates, for example, (x, y, z), where x is the coordinate on the horizontal image axis, y is the coordinate on the vertical image axis, and z is the coordinate on the depth direction. The present disclosure focuses on the problems involving the 3D gesture estimation.

Figure 5:
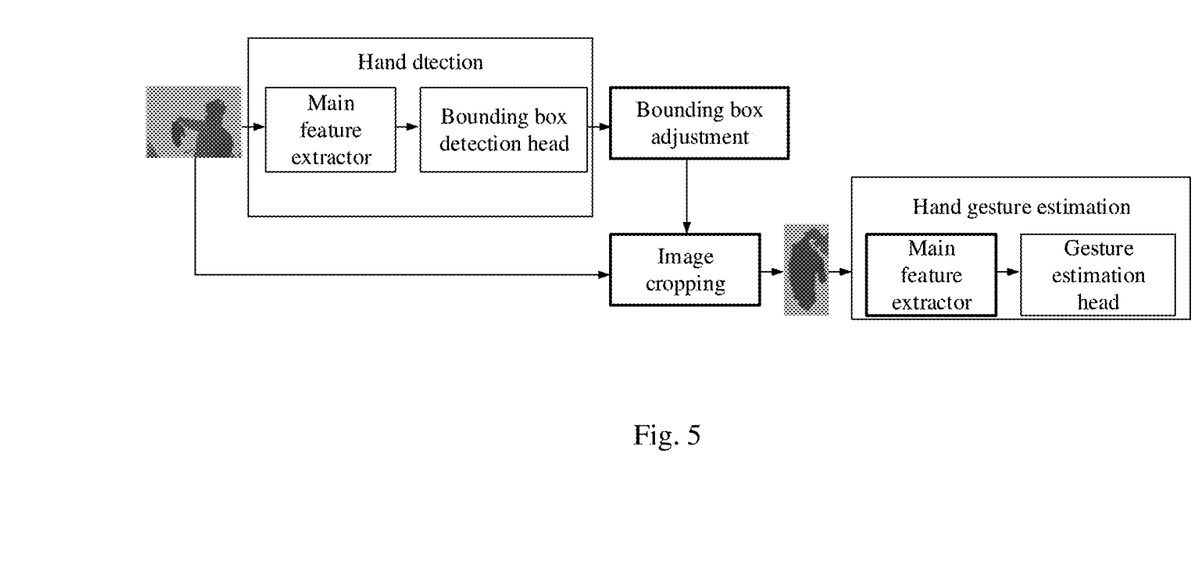
FIG. 5 is a schematic flowchart of hand gesture detection.

For the hand detection, a typical hand gesture detection flow line includes processes of hand detection and hand gesture estimation. The hand detection includes a backbone feature extractor and a bounding box detection head, and the hand gesture estimation includes a backbone feature extractor and a gesture estimation head. A schematic flowchart of hand gesture detection is illustrated in FIG. 5. It should be noted that the tasks of the hand detection and the hand gesture estimation are completely separate. In order to couple these two tasks, the output bounding box position is adjusted to the mass center of the pixels inside the bounding box, and the size of the bounding box is slightly enlarged to include all the hand pixels. The original depth image is cropped by using the adjusted bounding box. The cropped image is inputted into the gesture estimation task. When the backbone feature extractor is applied twice to extract image features, repeated computations may occur.

Figure 6:
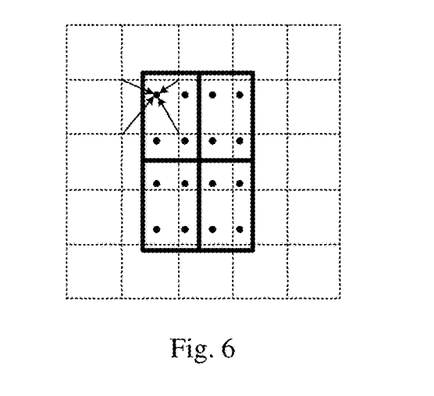
FIG. 6 is a schematic diagram of a visualization operation of RoIAlign.

RoIAlign layer removes the harsh quantization of RoI-Pool and correctly aligns the extracted features with the input. In other words, any quantization of RoI boundaries or bins is avoided (i.e. using x/16 instead of [x/16]). Specifically, bilinear interpolation is used to calculate the exact values of the input features at four regularly sampled positions in each RoI bin, and the results are aggregated (using either the maximum or mean value), referring to FIG. 6 for details. The visual grid represents a feature map, the solid line represents the RoI (2*2 grid in this example), and the points are the 4 sampling points in each grid. RoIAlign calculates the value of each sampling point from nearby grid points on the feature map by bilinear interpolation. No quantization is performed on any coordinates involved in the RoI, its bins or sampling points.

It can be appreciated that, the result is not sensitive to the exact sampling position or the number of sampling points, as long as no quantization is performed.

In the process of the hand pose estimation, it is necessary to calculate UVD coordinates and XYZ coordinates of key points of a feature, where the relation between the UVD coordinates and the XYZ coordinates is expressed as the following Equation 1. From UVD to XYZ, (x, y, z) is coordinates in XYZ format, (u, v, d) is ordinates in UVD format. Cx and Cy represent the principal point, which should be in the center of the image in the optimal case, and fx and fy are the focal lengths in the x and y directions.

$$x = \frac{(u - C_x) * d}{f_x}, y = \frac{(v - C_y) * d}{f_y}, z = d.$$

The hand gesture estimation can be achieved through a Convolutional Neural Network (CNN). The CNN consists of an input layer, an output layer, and a plurality of hidden layers. The hidden layers of the CNN usually consist of a series of convolutional layers that convolved with multiplication or other dot product. The activation function is usually a RELU layer, and is subsequently followed by other convolutions such as pooling layers, fully connected layers and normalization layers, referred to as hidden layers as their inputs and outputs are masked by the activation function and the final convolution. The final convolution, in turn, usually involves backpropagation in order to weigh the end product more accurately. Although these layers are usually referred to as convolutions, this is just by convention. Mathematically, it is technically a sliding dot product or cross-correlation. This has significance for the indices in the matrix, as it affects the manner that weights are determined at specific index points.

When programming CNN, each convolutional layer in a neural network should have the following attributes:

1. The input is a tensor with shape (number of images)×(image width)×(image height) ×(image depth).
2. The convolution kernel's width and height are hyper-parameters, and the convolution kernel's depth must be equal to the depth of the image. The convolutional layer convolves the input and passes its result to the next layer. This is analogous to a response of a neuron in the visual cortex to a specific stimulus.

Each convolutional neuron processes data only in terms of its receptive field. Although fully connected feedforward neural networks can be used to learn features and classify data, it is not practical to apply this architecture to images. Due to the very large input size associated with the image (each pixel is a relevant variable), even in a shallow architecture (as opposed to deep one), a very large number of neurons are required. For example, a fully connected layer for a (small) image of size 100×100 has 10,000 weights for each neuron in the second layer. The convolution operation provides a solution to this problem because it reduces the number of free parameters and allows the network to be deeper with fewer parameters. For example, tiling regions of size 5×5 have each the same shared weights regardless of the image size, and only 25 learnable parameters are required. In this way, it solves the problem that gradients may vanish or explode during the training of a conventional multi-layer neural networks with many layers through backpropagation.

Convolutional networks may include local or global pooling layers to simplify the underlying computation. Pooling layers reduce the dimensions of the data by combining the outputs of neuron clusters at one layer into a single neuron in the next layer. The local pooling combines small clusters, usually 2×2 small clusters. The global pooling is applied to all neurons of the convolutional layer. In addition, the maximum or average value can be calculated through pooling. The maximal pooling uses the maximum value from each cluster of neurons in the prior layer. The average pooling uses the average from each cluster of neurons in the prior layer.

The fully connected layer connects every neuron in one layer to every neuron in another layer. It is in principle the same as the conventional Multi-Layer Perceptron (MLP) neural network. The flattened matrix goes through a fully connected layer to classify the images.

The technical solutions of the present disclosure and how the technical solutions of the present disclosure solve the above-mentioned technical problems will be specifically described in detail below with reference to the accompanying drawings. The following specific embodiments may be combined with each other, and the same or similar concepts or processes may not be repeated in some embodiments.

Figure 7:
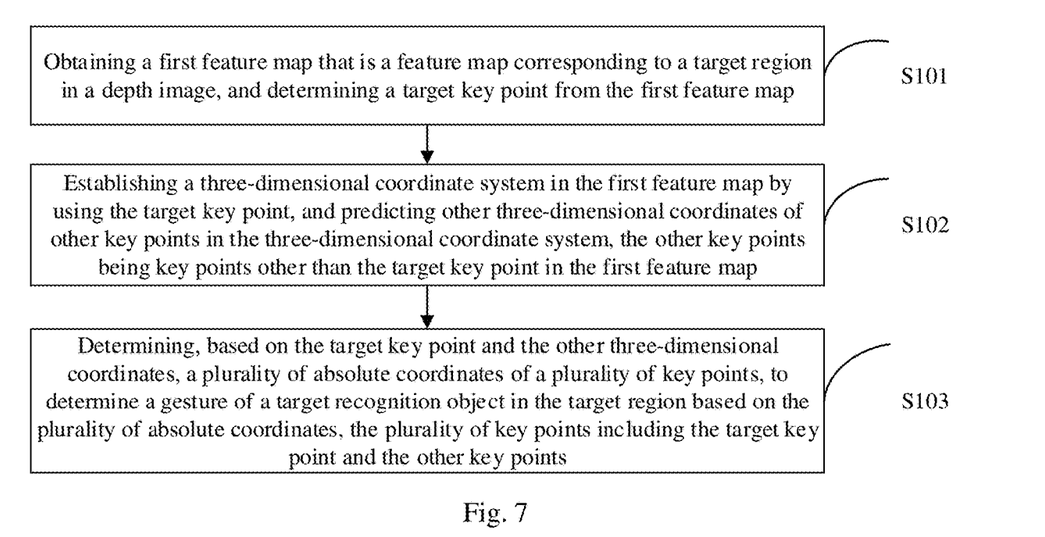
FIG. 7 is a flowchart of a gesture recognition method according to an embodiment.

The embodiment provides a gesture recognition method, as illustrated in FIG. 7. The method may include the following actions in blocks.

At block S101, a first feature map is obtained, and a target key point is determined from the first feature map. The first feature map is a feature map corresponding to a target region in a depth image.

The gesture recognition method provided in the embodiment is suitable for the scenarios of 3D gesture estimation.

Figure 8:
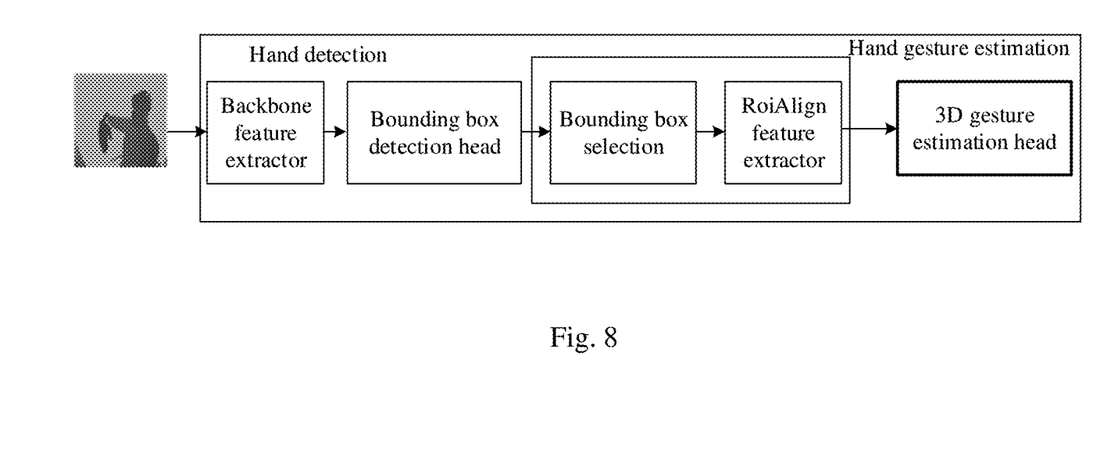
FIG. 8 is a schematic diagram of a 3D gesture estimation process according to an embodiment.

The 3D gesture estimation includes two processes, i.e., the hand detection and the hand gesture estimation, as illustrated in FIG. 8. The hand detection process includes a backbone feature extractor and a bounding box detection head. The depth image is captured by the TOF camera and sequentially transmitted to the backbone feature extractor and bounding box detection head for processing, and the hand region in the depth image is outputted. Thereafter, the hand region is inputted into the bounding box selection and RioAlign feature extractor, to obtain a RioAlign feature map corresponding to the hand region. The gesture recognition method of the present disclosure is executed subsequent to the RioAlign feature extractor, and the RioAlign feature map is used as a regression head of the 3D hand gesture estimation task to implement the gesture recognition process in the present disclosure.

It should be noted that, in the present disclosure, when a target recognition object is a hand, the target region of the depth image is the above-mentioned hand region, and the first feature map is the RioAlign feature map of the hand region.

In the present embodiment, after the first feature map is obtained, the target key point in the first feature map is determined.

It should be noted that, in the scenario of realizing hand gesture recognition, the target key point is a predetermined key point of a hand joint, which may be a key point of a thumb root, a key point of index finger root, and the like.

In the present embodiment, the position of the thumb root is predetermined as a coordinate origin of a three-dimensional coordinate system, the key point of the thumb root is the target key point, and a gesture recognition apparatus searches for the key point of the thumb root from the first feature map.

It can be understood that, in most hand gestures, the thumb root is not occluded, and thus the key point of the thumb root is used as the target key point to increase the accuracy of the three-dimensional coordinate system determined in the first feature map, thereby increasing the accuracy of gesture recognition. The present embodiment is not limited to using the key point of the thumb root as the target key point, and the target key point may be predetermined based on other selection strategies and is not limited in the embodiment.

At block S102, a three-dimensional coordinate system is established in the first feature map by using the target key point, and other three-dimensional coordinates of other key points in the three-dimensional coordinate system are determined. The other key points are key points other than the target key point in the first feature map.

After the gesture recognition apparatus determines the target key point in the first feature map, the gesture recognition apparatus establishes the three-dimensional coordinate system in the first feature map by using the target key point, and predicts the other three-dimensional coordinates of the other key points, which are located in the first feature map, in the three-dimensional coordinate system.

In the present embodiment, the three-dimensional coordinate system is established by taking the target key point as the coordinate origin of the three-dimensional coordinate system. That is, the coordinates of the target key point in the three-dimensional coordinate system are (0, 0, 0).

For example, 20 key points of hand joints can be set as a plurality of key points, as illustrated in FIG. 3. The key point of the thumb root 18 is the target key point, and the other 19 key points of hand joints are the other key points.

In the present embodiment, the first feature map is sequentially input to an XYZ encoder and a fully connected layer, to obtain the other three-dimensional coordinates corresponding to the other key points based on the three-dimensional coordinate system.

It should be noted that the three-dimensional coordinate system is an XYZ coordinate system, and the other three-dimensional coordinates are XYZ coordinates in the XYZ coordinate system.

It should be noted that, before the first feature map is inputted into the XYZ encoder, a base feature extractor is used to extract key point features on the first feature map.

Figure 9:
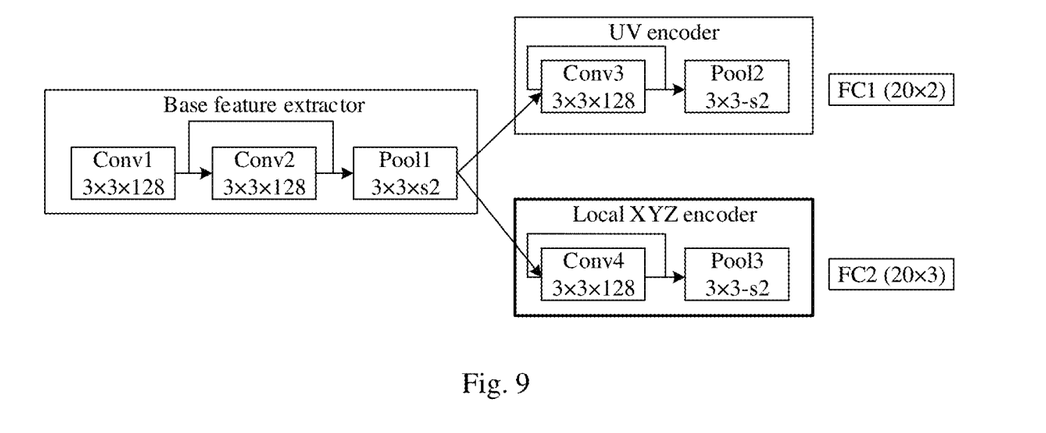
FIG. 9 is a schematic diagram of a key point feature-extracting process according to an embodiment.

For example, as illustrated in FIG. 9, for a 7×7×256 feature map, the channels are reduced from 256 channels to 128 channels by using a 3×3×128 convolutional layer Conv1, and then the 7×7×128 feature map is convolved with a convolutional layer Conv2 (with a size of 3×3×128), further to extract base key point features. Conv2 has skip connection, adding the input of Conv2 to the output of Conv2. This Conv2, with its skip connection, is repeated for 4 times. After that, the key point features of 7×7×128 map are mapped, and are down-sampled 2 times to a size of 3×3×128 through the max pooling of kernel 3×3 (i.e., Pool1).

After the base feature extractor is used to extract the key point features on the first feature map, the key point features on the first feature map are sequentially input into the XYZ encoder and the fully connected layer, to obtain the other three-dimensional coordinates corresponding to the other key points.

Referring to FIG. 9, a 3×3×128 feature map is inputted into the local XYZ encoder and is convolved with Conv4 to output the key point feature map with the same size, and then the skip connection adds the input of Conv4 to the output of Conv4. Conv4 with corresponding the skip connection is repeated 4 times. After that, the 3×3×128 key point feature map is down-sampled 2 times to a size of 1×1×128 through the max pooling of kernel 3×3 (i.e. Pool3). After that, the feature map of size 1×1×128 is inputted into the fully connected layer FC2 to regress other XYZ coordinates of other key points in the XYZ coordinate system.

At block S103, a plurality of absolute coordinates of a plurality of key points are determined based on the target key point and the other three-dimensional coordinates, to determine a gesture of a target recognition object in the target region based on the plurality of absolute coordinates. The plurality of key points includes the target key point and the other key points point.

After the gesture recognition apparatus predicts the other three-dimensional coordinates of the other key points in the three-dimensional coordinate system, the gesture recognition apparatus determines, based on the target key point and the other three-dimensional coordinates, the plurality of absolute coordinates of the plurality of key points including the target key point and the other key points, so as to determine the gesture of the target recognition object in the target region based on the plurality of absolute coordinates.

In the present embodiment, target absolute coordinates of the target key point are first determined; then, based on the target absolute coordinates and other three-dimensional coordinates, the plurality of absolute coordinates of the plurality of key points are determined. The plurality of absolute coordinates is composed of the target absolute coordinates and other absolute coordinates.

In the present embodiment, the target absolute coordinates and the other three-dimensional coordinates are added to obtain other absolute coordinates of the corresponding other key points.

In the present embodiment, the specific actions of determining the target absolute coordinates of the target key point include: obtaining a two-dimensional position of the target key point, determining a target absolute depth of the target key point based on the two-dimensional position; and determining the target absolute coordinates of the target key point based on the target absolute depth of the target key point.

It should be noted that the two-dimensional position of the target key point is obtained through the UV encoder. Specifically, the first feature map is inputted into a UV encoder to obtain target UV coordinates of the target key point, and the target UV coordinates are determined as the 2D location of the target key point.

Referring to FIG. 9, a 3×3×128 feature map is inputted into the UV encoder and is convolved with Conv3 to output a key point feature map with the same size, and then the skip connection adds the input of Conv3 to the output of Conv3. Conv3 with corresponding skip connection is repeated 4 times. After that, the 3×3×128 key point feature map is down-sampled 2 times to a size of 1×1×128 through the max pooling of kernel 3×3 (i.e., Pool2). After that, the 1×1×128 feature map is inputted into the fully connected layer FC1 to regress the target UV coordinates of the target key point.

It should be noted that after the two-dimensional position of the target key point is obtained, it is determined whether the two-dimensional position is located in a background of the depth image. In response to determining that the two-dimensional position of the target key point is located in the background of the depth image, the depth values of pixels in a predetermined range, which is having the dimensional position as a center, are determined, and a closest depth is determined from the depth values of the pixels within the predetermined range. The target absolute depth is determined by using the closest depth.

For example, when the 2D position of the key point of the thumb root falls on the background, within the 5*5 bounding box (the predetermined range) by taking the 2D position of the key point of the thumb root as the center, the depth values of all pixels are searched for, the closest depth is determined, and then the absolute depth of the key point of the thumb root is calculated based on the closest depth.

In the present embodiment, the UV encoder may be used to determine the depth values of all pixels within the predetermined range having the two-dimensional position as the center.

Further, after the target absolute depth of the key point of the thumb root is determined, an absolute depth in absolute coordinates of the other key points is obtained based on the target absolute depth of the key point of the thumb root and a depth in other predicted three-dimensional coordinates of the other key points.

After the plurality of absolute coordinates of the plurality of key points in the first feature map is obtained, the gesture of the target recognition object in the first feature map can be restored based on the plurality of absolute coordinates, and based on the gesture of the target recognition object, VR, AR, robotic control, and sign language recognition can be realized.

It can be understood that the gesture recognition apparatus determines the target key point from the first feature map, establishes the three-dimensional coordinate system based on the target key point, and then predicts the other three-dimensional coordinates of the other key points in the three-dimensional coordinate system. The gesture recognition apparatus indirectly calculates the plurality of absolute coordinates of the plurality of key points based on the other three-dimensional coordinates. Due to the slight calculation error of the three-dimensional coordinate system established based on the target key point, the error of gesture recognition is reduced, and the accuracy of gesture recognition is improved.

Figure 10:
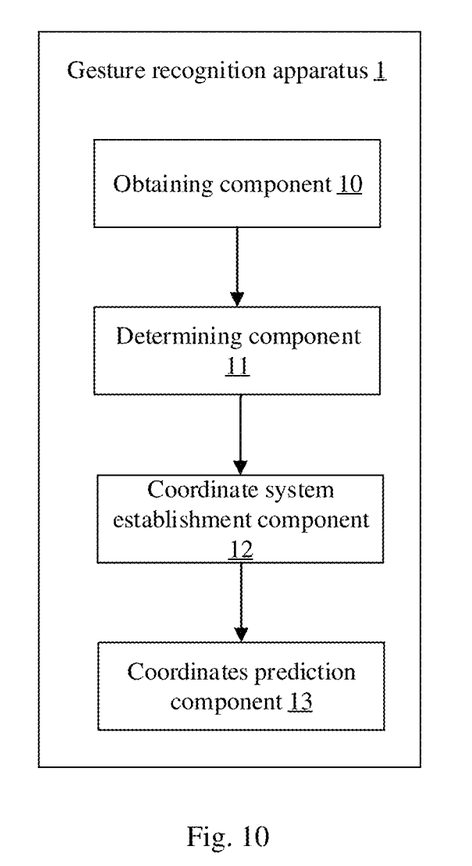
FIG. 10 is a first schematic structural diagram of a gesture recognition apparatus according to an embodiment.

The embodiment provides a gesture recognition apparatus 1, as illustrated in FIG. 10. The apparatus 1 includes an obtaining component 10, a determining component 11, a coordinate system establishment component 12, and a coordinate prediction component 13. The obtaining component 10 is configured to obtain a first feature map that is a feature map corresponding to a target region in a depth image. The determining component 11 is configured to: determine a target key point from the first feature map; determine, based on the target key point and other three-dimensional coordinates, a plurality of absolute coordinates of a plurality of key points, to determine a gesture of a target recognition object in the target region based on the plurality of absolute coordinates, the plurality of key points including the target key point and the other key point. The coordinate system establishment component 12 is configured to establish a three-dimensional coordinate system in the first feature map by using the target key point. The coordinate prediction component 13 is configured to predict the other three-dimensional coordinates of the other key points in the three-dimensional coordinate system, the other key points being key points other than the target key point in the first feature map.

In an alternative embodiment, the coordinate prediction component 13 is further configured to sequentially input the first feature map into an XYZ encoder and a fully connected layer, to obtain the other three-dimensional coordinates corresponding to the other key points based on the three-dimensional coordinate system.

In an alternative embodiment, the determining part 11 is further configured to determine the target absolute coordinates of the target key point; and determine, based on the target absolute coordinates and the other three-dimensional coordinates, the plurality of absolute coordinates.

In an alternative embodiment, the obtaining component 10 is further configured to obtain a two-dimensional position of the target key point; the determining component 11 is further configured to determine, based on the two-dimensional position, a target absolute depth of the target key point; and determine, based on the target absolute depth of the target key point, the target absolute coordinates of the target key point.

In an alternative embodiment, the determining component 11 is further configured to input the first feature map into a UV encoder into obtain target UV coordinates of the target key point; and determine the target UV coordinates as the two-dimensional position.

In an alternative embodiment, the apparatus further includes a searching component. The searching component is configured to, in response to determining that the two-dimensional position is located in a background of the depth image, determine depth values of pixels within a predetermined range having the two-dimensional position as a center. The determining component 11 is further configured to: determine a closest depth from the depth values of the pixels within the predetermined range, and determine the target absolute depth by using the closest depth.

In an alternative embodiment, the target recognition object is a hand, and the target key point is a key point of a thumb root.

For the gesture recognition apparatus provided by the embodiment, a first feature map, which is a feature map corresponding to a target region in a depth image, is obtained; a target key point is determined from the first feature map; a three-dimensional coordinate system is established in the first feature map by using the target key point; other three-dimensional coordinates of other key points in the three-dimensional coordinate system are predicted, the other key points being key points other than the target key point in the first feature map; based on the target key points and the other three-dimensional coordinates, a plurality of absolute coordinates of a plurality of key points is determined, so as to determine a gesture of a target recognition object in the target region based on the plurality of absolute coordinates. The plurality of key points includes the target key point and the other key points. In this regard, the gesture recognition apparatus provided in the embodiment determines the target key point from the first feature map, establishes the three-dimensional coordinate system based on the target key point, and then predicts the other three-dimensional coordinates of the other key points in the three-dimensional coordinate system. The gesture recognition apparatus indirectly calculates the plurality of absolute coordinates of the plurality of key points based on the other three-dimensional coordinates. Due to the slight calculation error of the three-dimensional coordinate system established based on the target key points, the error of gesture recognition is further reduced and the accuracy of gesture recognition is improved.

Figure 11:
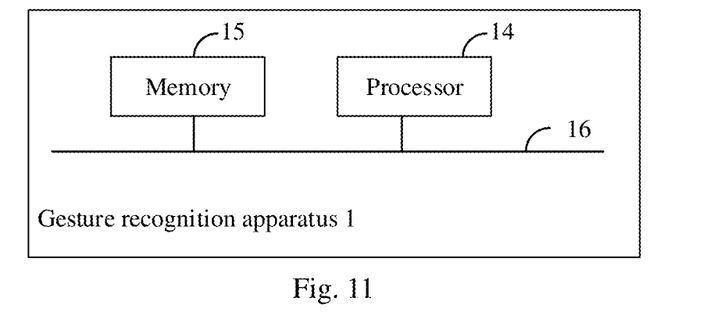
FIG. 11 is a second schematic structural diagram of a gesture recognition apparatus according to an embodiment.

FIG. 11 is a second schematic structural diagram of a gesture recognition apparatus according to an embodiment. In practical applications, based on the same disclosed concept of the above-mentioned embodiments, the gesture recognition apparatus 1 of the embodiment includes a processor 14, a memory 15 and a communication bus 16, as illustrated in FIG. 11.

In the process of the specific embodiment, the above-mentioned obtaining component 10, determining component 11, coordinate system establishment component 12, coordinates prediction component 13 and searching component can be realized by the processor 14 located in the gesture recognition apparatus 1. The above-mentioned processor 14 can be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a CPU, a controller, a microcontroller, and a microprocessor. It can be understood that, for different apparatuses, the electronic device used to implement the function of the processor may also be other, which is not specifically limited in the embodiment.

In the present embodiment, the above-mentioned communication bus 16 is used to implement connection communication between the processor 14 and the memory 15. When the above-mentioned processor 14 executes an operating program stored on the memory 15, the processor 14 implements the gesture recognition method described in the above-mentioned embodiments.

The present embodiment provides a storage medium having a computer program stored thereon. The computer-readable storage medium stores one or more programs, which can be executed by one or more processors and are applicable to the gesture recognition apparatus. The computer program implements the gesture recognition method described in the above embodiments.

The above descriptions are only preferred embodiments of the present disclosure, and are not intended to limit the protection scope of the present disclosure.

INDUSTRIAL APPLICABILITY

The embodiments provide a gesture recognition method and apparatus, and a storage medium. The method includes: obtaining a first feature map that is a feature map corresponding to a target region in a depth image, and determining a target key point from the first feature map; establishing a three-dimensional coordinate system in the first feature map by using the target key point, and predicting other three-dimensional coordinates of other key points in the three-dimensional coordinate system, the other key points being key points other than the target key point in the first feature map; and determining, based on the target key point and the other three-dimensional coordinates, a plurality of absolute coordinates of a plurality of key points, to determine a gesture of a target recognition object in the target region based on the plurality of absolute coordinates, the plurality of key points including the target key point and the other key points. With the above implementation scheme, the gesture recognition apparatus determines the target key point from the first feature map, establishes the three-dimensional coordinate system based on the target key point, and then predicts the other three-dimensional coordinates of the other key points in the three-dimensional coordinate system. The gesture recognition apparatus indirectly calculates the plurality of absolute coordinates of the plurality of key points based on the other three-dimensional coordinates. Due to the slight calculation error of the three-dimensional coordinate system established based on the target key point, the error of gesture recognition can be reduced, thereby improving the accuracy of gesture recognition.

What is claimed is:

1. A gesture recognition method, comprising:
    obtaining a first feature map that is a feature map corresponding to a target region in a depth image, and determining a target key point from the first feature map, the target recognition object being a hand, and the target key point being a key point of a thumb root;
    establishing a three-dimensional coordinate system in the first feature map by taking the target key point as a coordinate origin, and predicting other three-dimensional coordinates of other key points in the three-dimensional coordinate system, the other key points being key points other than the target key point in the first feature map; and
    determining, based on the target key point and the other three-dimensional coordinates, a plurality of absolute coordinates of a plurality of key points, to determine a gesture of a target recognition object in the target region based on the plurality of absolute coordinates, the plurality of key points comprising the target key point and the other key points.

2. The method according to claim 1, wherein said predicting the other three-dimensional coordinate of the other key points in the three-dimensional coordinate system comprises:
    inputting the first feature map into an XYZ encoder and a fully connected layer sequentially, to obtain the other three-dimensional coordinates corresponding to the other key points based on the three-dimensional coordinate system.

3. The method according to claim 1, wherein said determining, based on the target key point and the other three-dimensional coordinates, the plurality of absolute coordinates of the plurality of key points comprises:
    determining target absolute coordinates of the target key point; and
    determining, based on the target absolute coordinates and the other three-dimensional coordinates, the plurality of absolute coordinates.

4. The method according to claim 3, wherein said determining the target absolute coordinates of the target key point comprises:
    obtaining a two-dimensional position of the target key point;
    determining, based on the two-dimensional position, a target absolute depth of the target key point; and
    determining, based on the target absolute depth of the target key point, the target absolute coordinates of the target key point.

5. The method according to claim 4, wherein said obtaining the two-dimensional position of the target key point comprises:
    inputting the first feature map into a UV encoder to obtain target UV coordinates of the target key point; and
    determining the target UV coordinates as the two-dimensional position.

6. The method according to claim 4, wherein said determining, based on the two-dimensional position, the target absolute depth of the target key point comprises:
    in response to determining that the two-dimensional position is located in a background of the depth image, determining depth values of pixels within a predetermined range having the two-dimensional position as a center, and determining a closest depth from the depth values of the pixels within the predetermined range; and
    determining the target absolute depth by using the closest depth.

7. A non-transitory storage medium, having a computer program stored thereon, wherein the computer program, when executed by a processor, implements the method according to claim 1.

8. A gesture recognition apparatus, comprising:
    a processor; and
    a memory, wherein the processor, when executing an operating program stored on the memory, implements a gesture recognition method comprising:
    obtaining a first feature map that is a feature map corresponding to a target region in a depth image, and determining a target key point from the first feature map, the target recognition object being a hand, and the target key point being a key point of a thumb root;
    establishing a three-dimensional coordinate system in the first feature map by taking the target key point as a coordinate origin, and predicting other three-dimensional coordinates of other key points in the three-dimensional coordinate system, the other key points being key points other than the target key point in the first feature map; and
    determining, based on the target key point and the other three-dimensional coordinates, a plurality of absolute coordinates of a plurality of key points, to determine a gesture of a target recognition object in the target region based on the plurality of absolute coordinates, the plurality of key points comprising the target key point and the other key points.

9. The apparatus according to claim 8, wherein the processor, when executing the operating program stored on the memory, implements:
    inputting the first feature map into an XYZ encoder and a fully connected layer sequentially, to obtain the other three-dimensional coordinates corresponding to the other key points based on the three-dimensional coordinate system.

10. The apparatus according to claim 8, wherein the processor, when executing the operating program stored on the memory, implements:
   determining target absolute coordinates of the target key point; and
   determining, based on the target absolute coordinates and the other three-dimensional coordinates, the plurality of absolute coordinates.

11. The apparatus according to claim 10, wherein the processor, when executing the operating program stored on the memory, implements:
   obtaining a two-dimensional position of the target key point;
   determining, based on the two-dimensional position, a target absolute depth of the target key point; and
   determining, based on the target absolute depth of the target key point, the target absolute coordinates of the target key point.

12. The apparatus according to claim 11, wherein the processor, when executing the operating program stored on the memory, implements:
   inputting the first feature map into a UV encoder to obtain target UV coordinates of the target key point; and
   determining the target UV coordinates as the two-dimensional position.

13. The apparatus according to claim 11, wherein the processor, when executing the operating program stored on the memory, implements:
   in response to determining that the two-dimensional position is located in a background of the depth image, determining depth values of pixels within a predetermined range having the two- dimensional position as a center, and determining a closest depth from the depth values of the pixels within the predetermined range; and
   determining the target absolute depth by using the closest depth.

* * * * *